United States Patent [19]

Kaneda et al.

[11] Patent Number: 5,335,217
[45] Date of Patent: Aug. 2, 1994

[54] OPTICAL INFORMATION RECORDING AND REPRODUCING APPARATUS

[75] Inventors: Tokuya Kaneda, Odawara; Akira Kuribayashi, Minami-ashigara, both of Japan

[73] Assignee: Hitachi, Ltd., Tokyo, Japan

[21] Appl. No.: 928,086

[22] Filed: Aug. 13, 1992

Related U.S. Application Data

[63] Continuation of Ser. No. 631,256, Dec. 20, 1990.

[30] Foreign Application Priority Data

Dec. 27, 1989 [JP] Japan .................................. 1-336735

[51] Int. Cl.$^5$ ............................................. G11B 33/14
[52] U.S. Cl. ................................ 369/77.2; 369/75.1; 360/97.04
[58] Field of Search .................. 369/75.1, 75.2, 77.1, 369/77.2, 292; 360/97.02, 97.04, 98.02, 98.06

[56] References Cited

U.S. PATENT DOCUMENTS

| | | | |
|---|---|---|---|
| 3,577,133 | 5/1971 | Garfein | 360/97.02 |
| 3,912,278 | 10/1975 | Teutsch | 369/75.1 |
| 4,092,687 | 5/1978 | Butsch | 360/97.02 X |
| 4,268,878 | 5/1981 | Kearns | 360/97.02 |
| 4,317,146 | 2/1982 | Gervais | 360/97.03 |
| 4,725,904 | 2/1988 | Dalziel | 360/97.02 X |
| 4,771,412 | 9/1988 | Aihara et al. | 369/75.1 |
| 4,831,476 | 5/1989 | Branc et al. | 369/75.1 X |
| 4,908,715 | 3/1990 | Krum et al. | 360/97.02 |
| 5,086,422 | 2/1992 | Hagiya et al. | 369/71 |
| 5,097,366 | 3/1992 | Ueki et al. | 360/97.02 |

FOREIGN PATENT DOCUMENTS

| | | | |
|---|---|---|---|
| 0456171 | 11/1991 | European Pat. Off. | 369/292 |
| 0465153 | 1/1992 | European Pat. Off. | 369/292 |
| 0084081 | 6/1980 | Japan | 360/97.02 |
| 63-282955 | 11/1988 | Japan . | |

*Primary Examiner*—Stuart S. Levy
*Assistant Examiner*—Paul J. Ditmyer
*Attorney, Agent, or Firm*—Fay, Sharpe, Beall, Fagan, Minnich & McKee

[57] ABSTRACT

An optical disk apparatus optically records and reproduces data from an optical information recording medium by an optical head. A first chamber is formed to accommodate at least an optical disk cartridge accommodating therein the recording medium and the optical head and is isolated from ambient air. The first chamber is spatially isolated from heat sources, such as a power supply or a circuit board package which needs cooling. Ambient air is supplied to the heat sources while bypassing the first chamber. In this manner, dust contained in ambient air is prevented from adhering to optical parts such as the optical disk and the optical head.

2 Claims, 2 Drawing Sheets

OPTICAL INFORMATION RECORDING AND REPRODUCING APPARATUS

This application is a continuation of application Ser. No. 07/631,256, filed Dec. 20, 1990, now abandoned.

BACKGROUND OF THE INVENTION

The present invention relates to an optical information recording and reproducing apparatus which records the information in or reproduces the information from an optical information recording medium, such as an optical disk, by means of an optical head, and more particularly relates to an arrangement of components of the optical information recording and reproducing apparatus for effectively preventing dust from adhering to the optical head.

An optical disk drive can record more than 1 GB of data in an optical disk with a diameter of 13 cm (5.25 inches) or 30 cm (12 inches) and is becoming widely used as a memory apparatus for electronic files or picture processing systems.

The optical disk drive is advantageous in that the optical disk is a recording medium with a large capacity and is exchangeable. To exchange the recording medium, a front loading mechanism as disclosed in Japanese Patent Unexamined Publication No. 63-282955 is adopted. The optical disk is encased in an optical disk cartridge for preventing the information recording surface thereof from being exposed to the atmosphere and for ease of handling.

In the optical disk drive according to the prior art, an optical disk cartridge encasing therein an optical disk is mounted on a turntable, which is rotated by a spindle motor, by a loading mechanism. An optical head which records information to and reproduces information from the optical disk is radially movably carried on an optical head supporting portion. The optical head is moved along the optical head supporting portion by a linear motor. The displacement of the optical head is detected by a linear encoder and the moving speed thereof is detected by a speed sensor. A base which supports these mechanisms is supported on a frame through vibration insulating rubber members. The optical disk drive is further provided with a power supply, a cooling fan and a board package mounting electronic circuits to control the mechanisms.

The optical disk drive according to the prior art has a drawback in that dust adheres to optical parts including the optical head in a case where ambient air which contains the dust is sucked into the frame by the cooling fan when the optical disk is rotated within the optical disk cartridge to perform the recording or reproducing of information. Thus, the conventional optical disk drive has a problem in that an error may take place in recording information in or reproducing information from the optical disk due to lack of quantity of light by the adhesion of dust. It has been found that the adhesion of dust is mainly caused by the accumulation of dust contained in ambient air on the lens of the optical head. The ambient air is supplied to the board package and the power source which need cooling.

SUMMARY OF THE INVENTION

Accordingly, it is an object of the present invention to provide an optical information recording and reproducing apparatus which is capable of effectively preventing dust from adhering to optical parts.

It is another object of the present invention to provide an optical information recording and reproducing apparatus which is capable of preventing dust in ambient air from adhering to optical components such as an optical head and an optical disk while the heat sources, such as a power supply and a circuit package board, are cooled by application of ambient air.

The present invention is applicable, for example, to an optical disk drive which uses an optical disk as the optical information recording medium.

The optical disk drive according to the present invention comprises: a spindle motor for rotating an optical disk encased in an optical disk cartridge; an optical head for irradiating a light beam against the optical disk rotated by the spindle motor for processing data, the processing of the data including at least one of recording and reproducing the data; a circuit board package mounting electronic circuit elements for controlling the optical head for the processing of the data; a first chamber for accommodating at least the optical head, spatially isolated form the circuit board package; and an air flow passage through which ambient air flows to a heat source such as the circuit board package. The heat source is cooled by supplying ambient air to it through the air flow passage without passing ambient air through the first chamber.

The optical disk drive according to the present invention is provided with a chamber for accommodating at least the optical head. The chamber is isolated from the ambient air and from at least the circuit board package. The ambient air containing dust may be effectively prevented from flowing to the optical head by ventilating ambient air through a casing of the optical disk drive without passing ambient air through the chamber. Thus, heat sources, such as a power source and the circuit board package, may be cooled while dust is effectively prevented from adhering to the optical head.

In the optical disk drive of the present invention, an expandable flexible member in the form of a bellows and a base cover may define therebetween a chamber isolated from at least the circuit board package for isolating the optical head from ambient air entering through air vents by a cooling fan. In this manner, dust is effectively prevented form adhering to the optical head.

DETAILED DESCRIPTION OF THE PREFERRED EMBODIMENT

With reference to the drawings, an optical disk drive according to the present invention will be described, which uses an optical disk as a recording medium.

Figure 3:
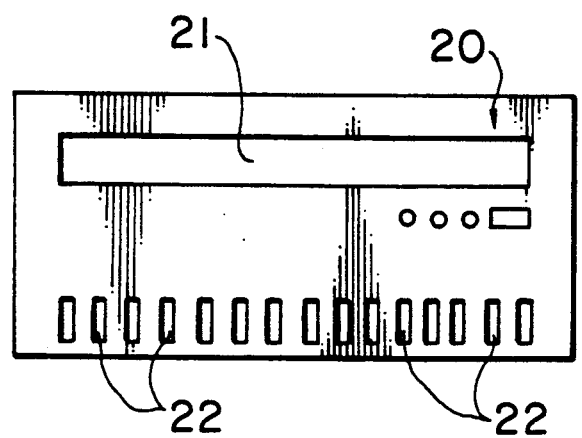
FIG. 3 is a front view of the optical disk drive shown in FIG. 1.

The optical disk drive includes a frame or casing 10 which encases the whole drive. The casing 10 is provided at a front thereof with a front panel 20 having a cartridge loading/ejecting slot 21 as shown in FIG. 3. An optical disk cartridge 36 is inserted into and ejected from the drive through the cartridge loading/ejecting slot 21. A loader 34 loads the optical disk cartridge 36 on a turn table 38 provided on a spindle motor 32. An optical disk 36a contained in the optical disk cartridge 36 is rotated by the spindle motor 32, and during the rotation of the optical disk 36a, an optical head 33 records information to or reproduces information from the optical disk 36a. A linear motor 39 is provided to move the optical head 33 in a radial direction of the optical disk 36a. The loader 34, the optical head 33 and the linear motor 39 are supported on a base 31. The components mounted on the base 31 are covered with a base cover 35. A plurality of vibration isolating legs 52 are provided on a bottom of the casing 10 so as to resiliently support the base 31.

Behind the base cover 35 there is arranged a power supply 41 for supplying electric power to components mounted on the base 31. A circuit board package 40 which mounts therein electronic circuit elements for controlling the components are also arranged behind the base cover 35.

Heat generated from the power supply 41 and other components is exhausted outside by fans 51a and 51b mounted to the casing 10. A flexible bellows 37 made of a chloroprene rubber is provided within the casing 10 so as to define a space communicating the cartridge loading/ejecting slot 21 of the front panel 20 with an interior of the base cover 35. The front panel 20 is provided at a lower portion thereof with air vents 22, and the casing 10 has louvers 42 formed in a rear wall thereof.

In the optical disk drive, the optical disk cartridge 36 is inserted into the base cover 35 through the cartridge loading/ejecting slot 21 and is then guided by the loader 34 to set on the turn table 38 mounted to the spindle of the spindle motor 32. The optical disk 36a within the optical disk cartridge 36 is rotated by the spindle motor 32, and in this state the optical head 33 is moved by the linear motor 39 to irradiate a light beam on an information recording surface of the optical disk 36a, so that the information is recorded or reproduced.

Figure 1:
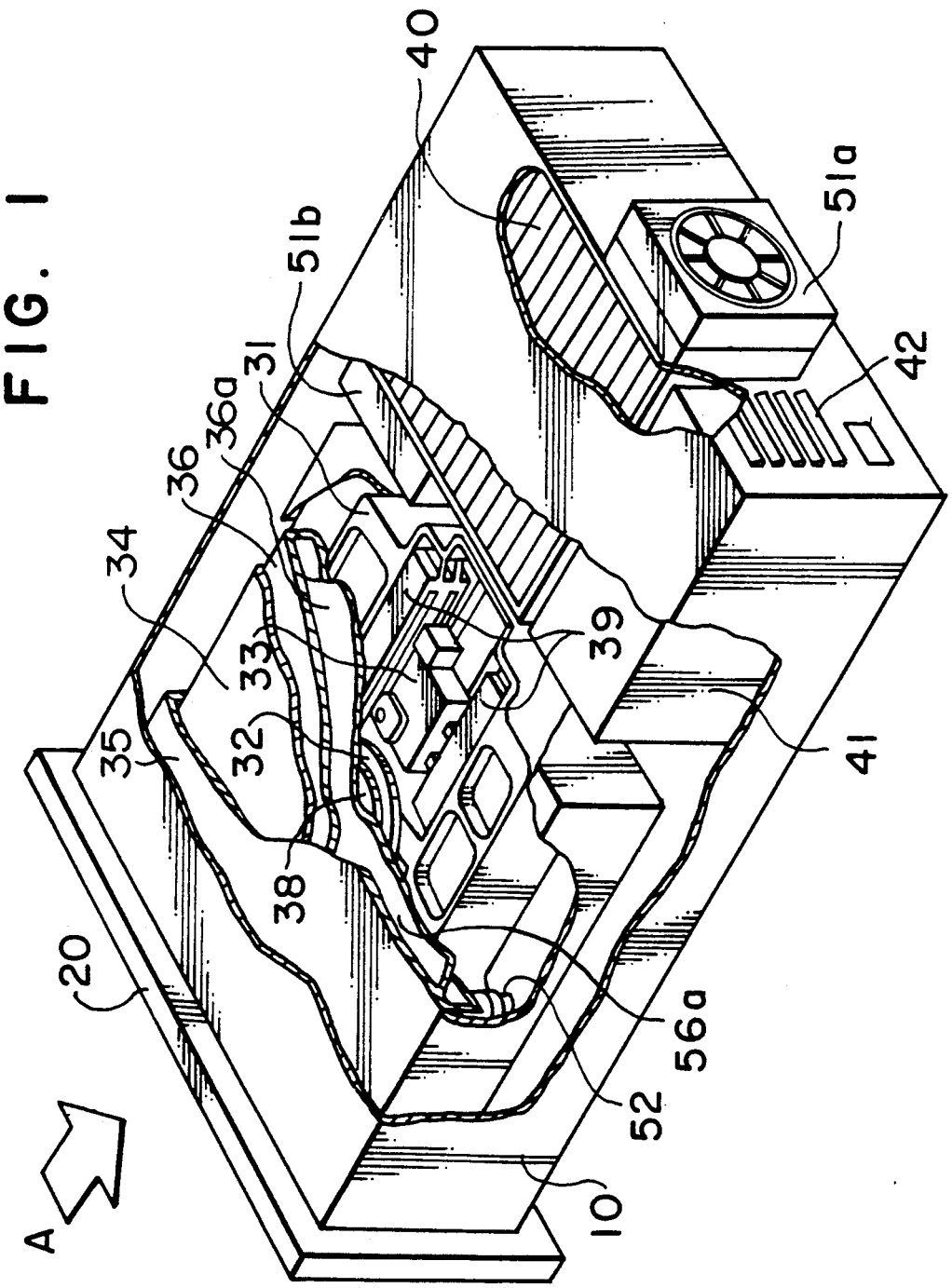
FIG. 1 is a perspective view showing an optical disk drive according to the present invention.
Figure 2:
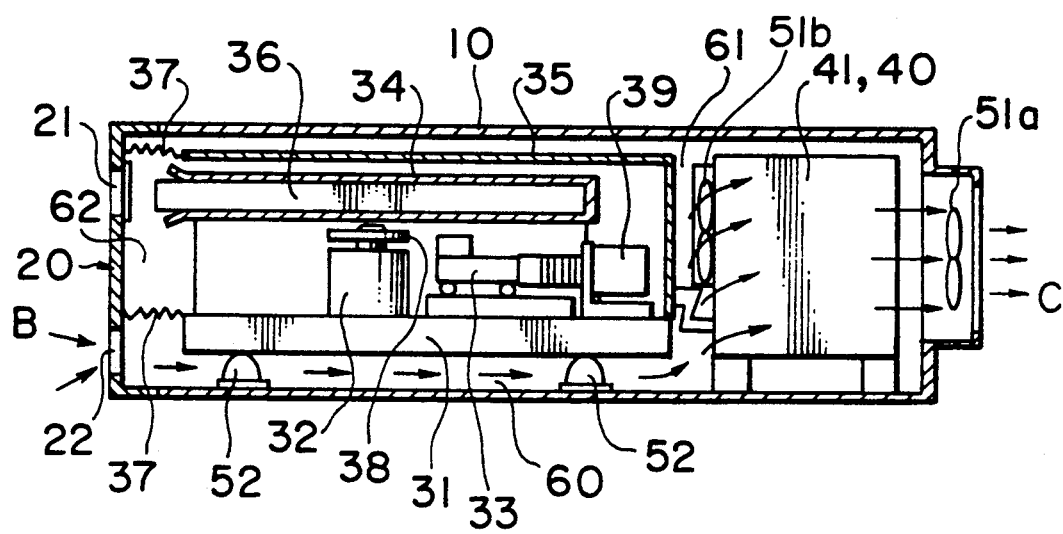
FIG. 2 is a cross-sectional view of the optical disk drive shown in FIG. 1.

In the optical disk drive, as illustrated in FIG. 2, components, such as linear motor 39, the spindle motor 32 and the optical head 33, mounted on the base 31 are received in a chamber 62 which is defined by the base cover 35, the front panel 20, the base 31 and the bellows 37, and which is separated from the circuit board package 40 and the power supply 41. Within the casing 10, there are thus formed chambers 60 and 61 isolated from the chamber 62, through which air flows. The circuit board package 40 and the power supply 41 are placed in the chamber 61. The chambers 60 and 61 constitute a passage of air for cooling the heat sources 40 and 41.

In the optical disk drive, it is important to cool the power supply 41 and the circuit board package 40 by actuating the fans 51a and 51b during recording and reproducing of the information on the optical disk cartridge 36. When the fans 51a and 51b are actuated, ambient air B flows into the chamber 60 through the air vents 22 of the front panel 20 as shown in FIG. 2. Then, ambient air flows through the chambers 60 and 61 which are separated from the chamber 62 by the base cover 35 and the bellow 37. The air cools the power supply 41 and the casing 10, and thereafter is exhausted through the fan 51a and the louvers 42 in a direction shown by the arrow C. The chamber 62 is separated by the base cover 35 and bellows 37 from the chambers 60 and 61, and hence optical components, such as the optical head 33, in the chamber 62 are prevented from being exposed to the air from the outside. Thus, the optical parts are protected from dust.

The bellows 37 are flexibly joined to the base 31 and the base cover 35 which are supported by the vibration isolating legs 52, and hence the vibration isolating legs 52 are not deteriorated in vibration isolating performance when an external force is applied to the casing 10.

In the embodiment, air vents 22 are provided in the front panel 20. However, air vents may be formed in side walls of the casing 10 in the vicinity of the front panel 20 or may be provided in at least one of side walls, the top wall and the bottom wall of the casing. When air vents are provided in side walls, the top wall or the bottom wall of the casing 10, air which flows in the vicinity of the chamber 62 reduces in quantity, and air is supplied to the power supply 41 and the circuit board package 40 through a shorter passage. Thus, the amount of duct entering the chamber 62 is reduced and the heat sources are efficiently cooled.

In the embodiment, two fans 51a and 51b are provided but two fans are not necessarily mounted. A single fan, the fan 51a for example, may be provided.

Further, in the above-mentioned embodiment, it has been explained that the cooling fan 51b is provided on the front surface of the circuit board package 40, but it can be provided on the front surface of the power source 41.

The chamber 62 is defined by the bellows 37, the base 31 and the base cover 35 but the base cover 35 may be directly attached to the wall of the front panel 20 without use of the bellows 37. In this case, the base cover 35 may be tightly attached to the casing 10 with ease by attaching a sponge elastic material to a portion of the base cover 35 to be secured to the casing 10.

The casing may be provided at a bottom thereof with air vents, and a chamber 60 may be defined between the base 31 and the bottom of the casing 10, through which ambient air B can flow. In this manner, ambient air B flows in the vicinity of the base 31, thereby the loader 34, the linear motor 39 and the optical head 33 which are mounted on the base 31 are cooled.

The power supply 41 may be arranged outside the casing 10.

In the embodiment, the front loading mechanism is adopted but the cartridge loading/ejecting opening may be provided in the top wall or the side wall of the casing 10 instead. The opening is opened or closed, through which the optical disk is placed at a predetermined position for recording or reproducing information.

Although in the embodiment, the optical disk drive is adopted using the optical disk as the recording medium, the present invention may be applied to any apparatus which optically records or reproduces information. For example, the present invention may be applied to an apparatus using as the information recording medium an optical card which is capable of optically recording information. The spindle motor is not necessary for the optical card apparatus.

We claim:

1. An optical information processing apparatus comprising:
   means for supporting an optical storage medium;
   means including an optical head for irradiating a light beam against the optical storage medium;
   a circuit board package mounting electronic circuit elements for controlling said optical head;

a first chamber accommodating at least said optical head, thereby isolating said optical head from at least said circuit board package;

an air flow passage isolated from said first chamber, through which ambient air flows to said circuit board package to bypass said first chamber;

a second chamber spatially isolated from said first chamber, wherein said air flow passage communicates with said second chamber;

a base cover; and a casing with a front portion, and an expandable flexible member;

wherein said base cover includes means forming an opening upstream of ambient air flowing through said air flow passage, and said opening forming means are connected to said front portion of the casing by said flexible member; and wherein said first chamber is isolated from said air flow passage and from the second chamber by said base cover.

2. An apparatus according to claim 1, wherein said flexible member is a bellows made of chloroprene rubber.

* * * * *